J. H. CRANSTON.
Slotting and Keyseat Machines.
No. 134,857. Patented Jan. 14, 1873.
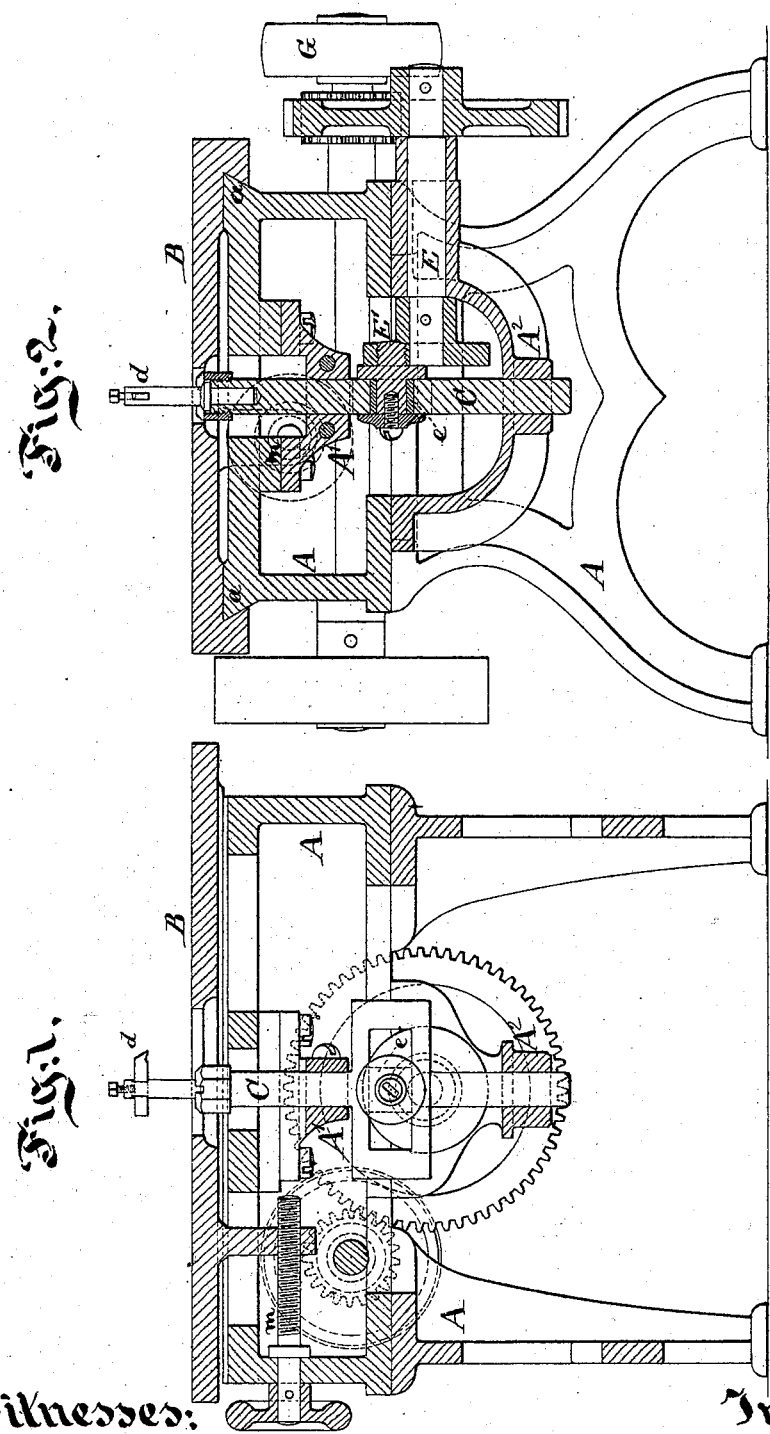
Witnesses:
Inventor:

UNITED STATES PATENT OFFICE.

JOHN H. CRANSTON, OF NORWICH, CONNECTICUT.

IMPROVEMENT IN SLOTTING AND KEY-SEAT MACHINES.

Specification forming part of Letters Patent No. 134,857, dated January 14, 1873.

*To all whom it may concern:*

Be it known that I, JOHN H. CRANSTON, of Norwich, New London county, Connecticut, have invented a new and Improved Slotting and Key-Seat Machine, of which the following is a specification:

I construct a machine operating a tool vertically by means of mechanism located below the table, so that the space above is entirely clear. I can lay on pulleys or wheels of any diameter, or cranks and other levers of any length, in any position, and can apply and remove the work from either side.

The following is a description of what I consider the best means of carrying out the invention.

The accompanying drawing forms a part of this specification.

Figure 1 is a vertical longitudinal section with the tool in its highest position, and Fig. 2 is a vertical cross-section of the same.

Similar letters of reference indicate like parts in all the figures.

A is a strong and stiff frame-work of cast-iron or other suitable material, having ways $a\ a$ to support and guide a sliding table, B, which has a wide slot extending longitudinally in or near its center line, through which the tool-carrier C is allowed to rise and sink, being operated by proper mechanism below. The tool, being secured to this carrier C by any suitable means, is caused to remove a proper "chip" at each reciprocation. The table B receives and supports the wheel or article to be slotted or furnished with a key-seat, the work being firmly held to the table by hook-bolts or other ordinary appliances. It will be understood that the table may have the ordinary T-section grooves to allow such bolts to take hold in the same manner as in the table of an ordinary lathe or planer.

The mechanism by which I guide and operate the tool-carrier C is simple and effective. A stout support or guide, $A^1$, embraces the carrier a little below the table B, and, being flattened or squared, and passing through a corresponding close-fitting hole, it is firmly supported against any motion, except a simple reciprocation up and down. $A^2$ is a lower support, which guides the tool-carrier near its lower end. The tool-carrier is greatly widened at one point between the bearings $A^1$ and $A^2$, and has a wide transverse slot which receives a block, $e$, which forms a bearing for a crank-pin, $E'$, carried on a shaft, E. This shaft is mounted in fixed bearings in the frame-work, and is rotated by gearing driven directly or indirectly by a belt from any convenient power acting on the pulley G. The rotation of the crank $E'$ causes a vertical reciprocation of the tool-carrier C, and consequently of the tool $d$.

The table B, with the work thereon, may be moved by slow gearing from the other works, or may be fed forward by hand, according to the judgment of the attendant, as will be readily understood.

I can employ any ordinary or suitable means of inducing a quick movement of the tool-carrier in one direction, and a slower movement in the opposite direction, if preferred.

I have represented the table B as moved by the hand-screw M. However it may be operated, it is evident that the construction allows it to move independently of the motion of the tool-carrier C and tool $d$. The tool is guided by depending on the supports $A^1\ A^2$ fixed to the framing A, and the table B with the work fixed on the latter, being capable of independent motion, allows the splining to be carried to any desired width, and also allows of slotting and planing in the interior of castings.

I claim as my invention—

The within-described slotting-machine having a tool-carrier traversing through a table and operated by suitable mechanism below, in combination with provisions for moving the table independently, the whole arranged so as to afford a clear space above the table adapted to serve as herein specified.

In testimony whereof I have hereunto set my hand this 15th day of June, 1872, in the presence of two subscribing witnesses.

J. H. CRANSTON.

Witnesses:
CHAS. D. NOYES,
S. T. HOLBROOK.